United States Patent
Kojo et al.

(10) Patent No.: US 11,776,401 B2
(45) Date of Patent: Oct. 3, 2023

(54) BOARDING POSITION SETTING METHOD, BOARDING POSITION SETTING DEVICE, AND BOARDING POSITION SETTING SYSTEM

(71) Applicants: Nissan Motor Co., Ltd., Yokohama (JP); Renault S.A.S., Boulogne-Billancourt (FR)

(72) Inventors: Naoki Kojo, Kanagawa (JP); Satoshi Kawai, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 256 days.

(21) Appl. No.: 17/054,546

(22) PCT Filed: May 13, 2019

(86) PCT No.: PCT/IB2019/000563
§ 371 (c)(1),
(2) Date: Nov. 11, 2020

(87) PCT Pub. No.: WO2019/220206
PCT Pub. Date: Nov. 21, 2019

(65) Prior Publication Data
US 2021/0256847 A1    Aug. 19, 2021

(30) Foreign Application Priority Data
May 15, 2018 (JP) .................. 2018-093644

(51) Int. Cl.
*G08G 1/13* (2006.01)
*G01C 21/34* (2006.01)

(52) U.S. Cl.
CPC .......... *G08G 1/13* (2013.01); *G01C 21/3438* (2013.01)

(58) Field of Classification Search
CPC .......... G08G 1/13; G08G 1/202; G08G 1/123; G01C 21/3438; G06Q 10/06; G06Q 50/30
See application file for complete search history.

(56) References Cited

U.S. PATENT DOCUMENTS 10,847,035 B2 * 11/2020 Kobayashi ............. G06Q 50/30
2008/0054072 A1    3/2008 Katragadda et al.
(Continued)

FOREIGN PATENT DOCUMENTS

| GB | 2572006 A | 9/2019 |
| JP | 2004-145801 A | 5/2004 |

(Continued)

*Primary Examiner* — Tarek Elarabi
(74) *Attorney, Agent, or Firm* — Global IP Counselors, LLP

(57) ABSTRACT

A boarding position setting method, a boarding position setting device, and a boarding position setting system are provided. The boarding position setting method, the boarding position setting device, and the boarding position setting system each recognizes a stop position of a vehicle based on vehicle information, determines whether the stop position is suitable for boarding based on a stop time of the vehicle or occurrence of a boarding event of the vehicle at the stop position, stores the stop position determined to be suitable for boarding as a boarding position in the vehicle dispatch service, acquires a first vehicle dispatch request to the vehicle dispatch service and sets the boarding position based on the first vehicle dispatch request from among stored boarding positions.

24 Claims, 6 Drawing Sheets

(56) References Cited

U.S. PATENT DOCUMENTS

| | | | |
|---|---|---|---|
| 2013/0110396 A1* | 5/2013 | Choudhury | |
| 2016/0370194 A1 | 12/2016 | Colijn et al. | |
| 2017/0003687 A1* | 1/2017 | Kojo | G08G 1/146 |
| 2018/0060991 A1* | 3/2018 | Yashiro | |
| 2018/0342157 A1* | 11/2018 | Donnelly | |
| 2019/0051174 A1* | 2/2019 | Haque | |
| 2019/0129438 A1* | 5/2019 | Morita | |

FOREIGN PATENT DOCUMENTS

| | | |
|---|---|---|
| JP | WO2016/114191 A1 | 9/2017 |
| JP | 2017-182137 A | 10/2017 |
| JP | 2018-032137 A | 3/2018 |

* cited by examiner

BOARDING POSITION SETTING METHOD, BOARDING POSITION SETTING DEVICE, AND BOARDING POSITION SETTING SYSTEM

CROSS-REFERENCE TO RELATED APPLICATIONS

This application is a U.S. national stage application of International Application No. PCT/IB2019/000563, filed on May 13, 2019. The present application claims priority based on Japanese Patent Application No. 2018-093644 filed May 15, 2018, and the entire contents is hereby incorporated herein by reference.

TECHNICAL FIELD

The present invention relates to a boarding position calculation method, boarding position calculation device, and boarding position calculation system.

BACKGROUND INFORMATION

A vehicle dispatch system has been proposed in which, based on a degree of difficulty of access from a geographical point where a user has made a vehicle dispatch request, the user is presented with one or more recommended boarding and alighting positions from among predetermined geographical points where boarding and alighting can occur, and a vehicle is dispatched to the boarding and alighting position selected by the user from the recommended boarding and alighting positions (see, U.S. Patent Application Publication No. 2016/0370194 A1, hereinafter referred to as patent document 1).

SUMMARY

However, according to the feature disclosed in patent document 1, no consideration is given to whether the geographical points where boarding and alighting can occur are suitable for boarding and alighting. Consequently, a location that is unsuitable for boarding and alighting can be specified by the vehicle dispatch system. Even if a location that is unsuitable for boarding and alighting has been specified, a driver can correct a stop position when the vehicle is actually driven by a driver, but in the case of a driverless vehicle, it is difficult to change the stop position from the location specified by the vehicle dispatch system. Accordingly, when the vehicle dispatch system is implemented using a driverless vehicle, a user may feel inconvenienced when boarding and alighting.

The present invention was devised in view of the foregoing problem, it being an object thereof to provide a boarding position calculation method, boarding position calculation device, and boarding position calculation system that calculates, at low cost, a location (boarding position) suitable for boarding in a vehicle dispatch service.

In order to solve the above-described problem, the boarding position calculation method, boarding position calculation device, and boarding position calculation system according to an embodiment of the present invention recognizes a stop position of a vehicle based on vehicle information, determines whether the stop position is suitable for boarding based on a stop time of the vehicle or occurrence of a boarding event of the vehicle at the stop position, and stores the stop position determined to be suitable for boarding as a boarding position in the vehicle dispatch service.

According to the present invention, a location suitable for boarding can be calculated at a low cost in the vehicle dispatch service based on an actual stop record of the vehicle.

BRIEF DESCRIPTION OF THE DRAWINGS

Referring now to the attached drawings which form a part of this original disclosure.

DETAILED DESCRIPTION OF EMBODIMENTS

Figure 1:
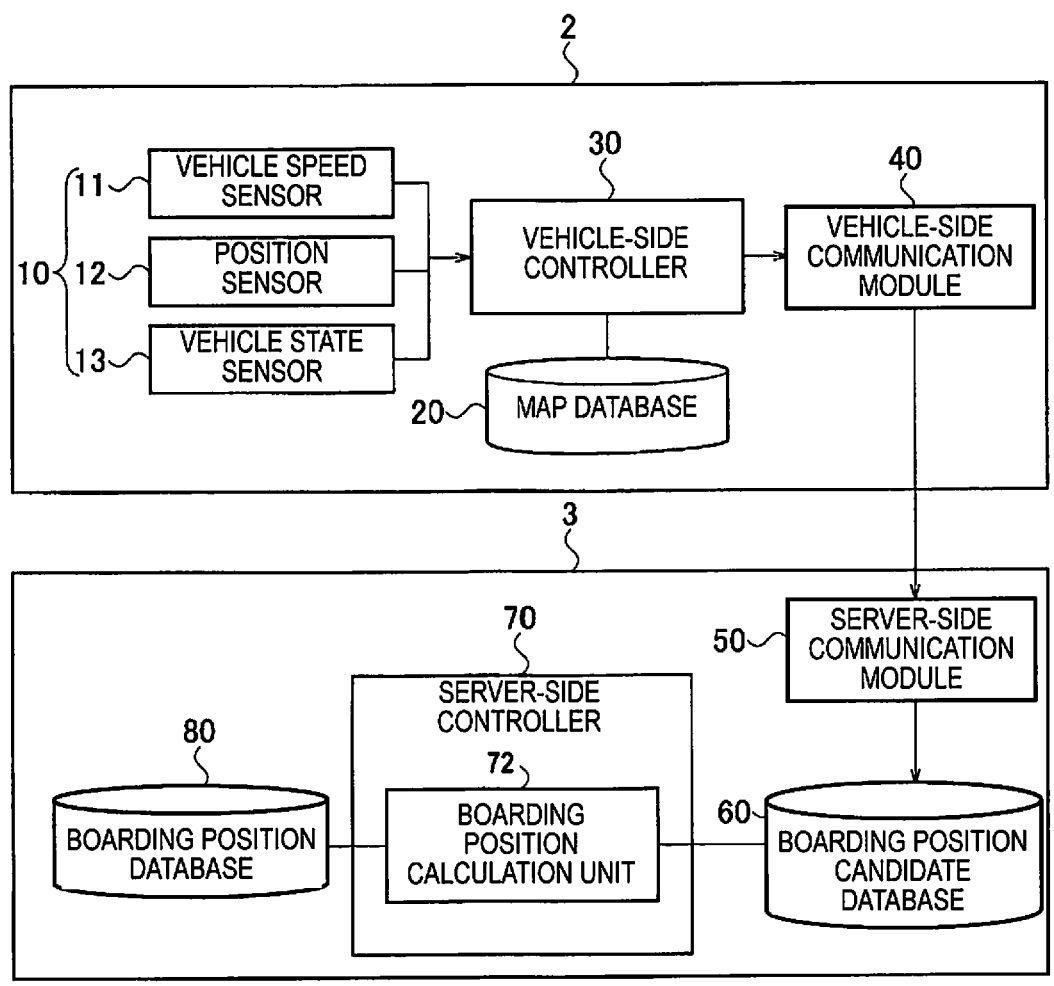
FIG. 1 is a block diagram showing a configuration of the boarding position calculation system according to an embodiment of the present invention.

Embodiments of the present invention are next described in detail with reference to the drawings. In the description, the same reference numerals are used for the same elements, and duplicate descriptions are omitted.

Configuration of the Boarding Position Calculation System

FIG. 1 is a block diagram showing a configuration of the boarding position calculation system according to the present embodiment. As shown in FIG. 1, the boarding position calculation system according to the present embodiment is composed of a vehicle 2 (boarding position calculation device) and a server 3. The vehicle 2 is provided with an acquisition unit 10 (acquisition unit, acquisition means), a map database 20, a vehicle-side controller 30, and a vehicle-side communication module 40 (communication unit, communication means). The server 3 is provided with a server-side communication module 50, a boarding position candidate database 60, a server-side controller 70, and a boarding position database 80 (storage unit, storage means).

In FIG. 1, the boarding position candidate database 60, the server-side controller 70, and the boarding position database 80 are included in the server 3, but the boarding position candidate database 60, the server-side controller 70, and the boarding position database 80 can be mounted in the vehicle 2, whereby the server 3 can be omitted. In this case, the vehicle-side communication module 40 and the server-side communication module 50 are not required, and the boarding position database 80 is configured based on information for a single vehicle 2.

The acquisition unit 10 is composed of, e.g., a vehicle speed sensor 11, a position sensor 12, and a vehicle state sensor 13. The present configuration is an example, but any configuration is possible as long as the sensor configuration allows the vehicle information (stop information indicating whether the vehicle is stopped, position information indicating the stop position of the vehicle, a boarding event, and the like) of the vehicle 2 to be calculated or detected. For example, the acquisition unit 10 can include an occupant-sensing sensor (sensing unit) that senses boarding by an occupant.

The vehicle speed sensor 11 is configured using, e.g., a rotational speed sensor, etc., installed in a wheel of the vehicle 2, calculates the vehicle speed of the vehicle 2, and transmits the calculated vehicle speed to the vehicle-side controller 30.

The position sensor 12 can be, e.g., a global positioning system (GPS)/inertial navigation system (INS) device. An INS is a device for calculating a relative position from an initial state of a mobile body using a gyro, an acceleration sensor, etc., and a GPS/INS device realizes high-precision position estimation by complementing absolute position information by GPS with relative position information by INS. In the present invention, a virtual stop line is calculated based on information about the stop position of the vehicle, and it is assumed that the virtual stop line will be used in control of automated driving. Relatively high positional precision of about several tens of centimeters is therefore required.

Another possible configuration of the position sensor 12 is an omnidirectional distance sensor. In this case, the vehicle position is calculated by so-called map matching. Also, any technique can be used as long as the technique allows the position information of the vehicle to be calculated. Described below in the present embodiment is the case in which a GPS/INS device is used.

The vehicle state sensor 13 senses an open/close state of doors of the vehicle 2 and a fastening state of each seatbelt. The acquired sensing results are transmitted to the vehicle-side controller 30 via a controller area network (CAN), etc. The vehicle state sensor 13 can additionally include: a seating sensor that is embedded in a seat and that senses, by pressure, whether an occupant is seated; occupant-sensing means that senses, for each seat, whether an occupant is seated, by using a camera mounted in the vehicle; and other sensors that ascertain a presence of an occupant.

The map database 20 is a high-precision map for automated driving, the map containing a record of road boundary lines for each lane, stop lines, and other accurate position information, and traffic rule information containing at least whether stopping is allowed. Unique identification information is assigned to each lane. The map database 20 is held in a storage device that can be accessed from the vehicle-side controller 30.

The map database 20 can be realized even with a simple navigation map, but a high-precision map is preferred in order to calculate a more accurate boarding position.

The vehicle-side controller 30 calculates, based on information acquired by the acquisition unit 10 and information in the map database 20, boarding position candidates that are candidates for a boarding position calculated by the boarding position calculation system. Boarding position candidate information that includes information related to a boarding position candidate is transmitted from the vehicle-side controller 30 to the vehicle-side communication module 40.

The boarding position candidate information includes at least position information, but can additionally include a point in time at which a vehicle stopped at a boarding position candidate, a length of vehicle stop time, a presence or absence of boarding and alighting, a vehicle type, and other information. It is also possible to include ID information of a lane that is linked to the map database 20 information and includes a boarding and alighting point candidate. The present embodiment is described as having all of these forms of information.

The vehicle-side controller 30 (an example of a control unit or a controller) is a general purpose microcomputer provided with a central processing device (CPU), memory, and an input and output unit. A computer program (boarding position calculation program) for causing the vehicle-side controller 30 to function as a part of the boarding position calculation system is installed in the vehicle-side controller. The computer program is executed, whereby the vehicle-side controller 30 functions as a plurality of information processing circuits (32, 34, 36, 38) provided by the boarding position calculation system.

Described hereinbelow is an example of the plurality of information processing circuits (32, 34, 36, 38) provided to a driving assist device being implemented by software. However, it is also possible to configure the information processing circuits (32, 34, 36, 38) by preparing dedicated hardware for executing various information processing described below. The plurality of information processing circuits (32, 34, 36, 38) can be configured by individual hardware. The information processing circuits (32, 34, 36, 38) can furthermore be used in combination with an electronic control unit (ECU) used in other vehicle-related controls.

The vehicle-side communication module 40 is connected to the vehicle-side controller 30 via the CAN, receives boarding position candidate information from the vehicle-side controller 30, and transmits information to the server-side communication module 50 of the server 3 by wireless communication. The vehicle-side communication module 40 can transmit the boarding position candidate information when received from the vehicle-side controller 30, or can transmit, at predetermined time intervals or in predetermined data quantities, the boarding position candidate information received from the vehicle-side controller 30 and accumulated in the memory, etc., in the vehicle-side communication module 40.

For example, the vehicle-side communication module 40 can be an onboard device provided with a 4G/LTE mobile communication function, and can be an onboard device provided with a Wi-Fi communication function.

The server-side communication module 50 receives boarding position candidate information transmitted from the vehicle-side communication module 40 and stores the information in the boarding position candidate database 60. The server-side communication module 50 can receive the boarding position candidate information from a single vehicle-side communication module 40, or can receive the boarding position candidate information from a plurality of vehicle-side communication modules 40. In other words, the communication counterpart of the server-side communication module 50 is not limited to a single vehicle 2, and can be a plurality of vehicles 2.

The boarding position candidate database 60 stores the boarding position candidate information received via the server-side communication module 50. The boarding position candidate information is linked to the lane identification information of the map database 20 and is stored in the boarding position candidate database 60. Specifying the lane identification information allows the boarding position candidate information correlated with the lane to be read out from the boarding position candidate database 60.

The server-side controller 70 decides a boarding position based on the boarding position candidate information stored in the boarding position candidate database 60. The boarding position information, which includes information related to a boarding position, is transmitted to the vehicle-side communication module 80.

The server-side controller 70 (an example of a control unit or a controller) is a general purpose microcomputer provided with a central processing device (CPU), memory, and an input and output unit. A computer program (boarding position calculation program) for causing the server-side controller 70 to function as the boarding position calculation system is installed in the server-side controller. The computer program is executed, whereby the server-side controller 70 functions as a plurality of information processing circuits (72, 74, 76) provided to the boarding position calculation system.

Described hereinbelow is an example of the plurality of information processing circuits (72, 74, 76) provided to a driving assist device being implemented by software. However, it is also possible to configure the information processing circuits (72, 74, 76) by preparing dedicated hardware for executing various information processing described below. The plurality of information processing circuits (72, 74, 76) can be configured by individual hardware. The information processing circuits (72, 74, 76) can furthermore be used in combination with an electronic control unit (ECU) used in other vehicle-related controls.

The boarding position database 80 stores the boarding position information transmitted from the server-side controller 70. The boarding position information is linked to the lane identification information of the map database 20 and is stored in the boarding position database 80. Specifying the lane identification information allows the boarding position information correlated with the lane to be read out from the boarding position database 80.

Configuration of the Vehicle-Side Controller

Figure 2:
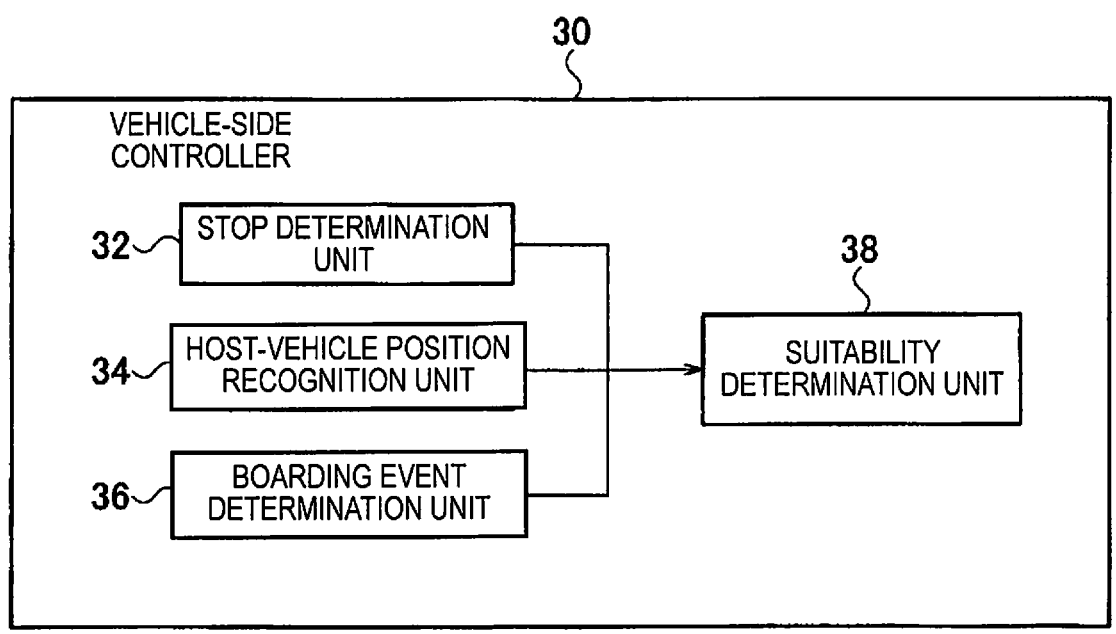
FIG. 2 is a block diagram showing a configuration of a vehicle-side controller included in the boarding position calculation system according to an embodiment of the present invention.

Described next with reference to FIG. 2 are the functions of the vehicle-side controller 30. FIG. 2 is a block diagram showing a configuration of the vehicle-side controller included in the boarding position calculation system according to the present embodiment.

As shown in FIG. 2, the vehicle-side controller 30 is provided with a stop determination unit 32, a host-vehicle position recognition unit 34 (position recognition unit, position recognition means), a boarding event determination unit 36, and a suitability determination unit 38 (determination unit, determination means), as the plurality of information processing circuits.

The stop determination unit 32 determines whether the vehicle 2 has stopped based on information about the speed of the vehicle 2 transmitted from the vehicle speed sensor 11. For example, it is determined that the vehicle 2 has stopped when the vehicle speed is 0 km/h. The stop determination unit 32 transmits, as stop information, information about whether the vehicle 2 has stopped to the suitability determination unit 38.

The stop determination unit 32 can be configured to determine that the vehicle 2 is stopped using the vehicle speed, or gearshift information of the vehicle 2 can be acquired to determine that the vehicle is stopped using the fact that the gearshift has been set in the P range (parking range). The stop determination unit 32 can also acquire information about the parking brake of the vehicle 2 to determine that the vehicle is stopped when the parking brake is been engaged.

When the vehicle 2 has stopped, the stop determination unit 32 measures the stop time beginning from the start of the stop until the vehicle begins traveling, and the measured stop time is transmitted together with the stop information to the suitability determination unit 38. For example, the stop determination unit 32 determines that the vehicle 2 has started traveling after a stop when the speed of the vehicle 2 has reached a predetermined vehicle speed or higher (e.g., 3 km/h or higher).

The host-vehicle position recognition unit 34 recognizes position of the vehicle 2 based on information transmitted from the position sensor 12. The host-vehicle position recognition unit 34 transmits position information of the vehicle 2 (stop position of the vehicle 2) to the suitability determination unit 38.

When the position sensor 12 is a GPS/INS device, the position information inputted from the position sensor 12 can be the position information of the vehicle 2. Also, when the position sensor 12 is an omnidirectional distance sensor, so-called map matching is carried out to calculate the relative position of the vehicle 2 with respect to a target around the vehicle 2 based on the map database 20. A common widely known technique can be used as the map matching technique.

The position of the vehicle 2 to be ultimately calculated by the host-vehicle position recognition unit 34 is a relative position with respect to the map, and map matching is therefore preferably used for directly calculating the position of the vehicle 2 on the map. Even when a method for calculating the vehicle position based on a GPS/INS device is used, there is no particular problem as long as an error with respect to the absolute position included on the map itself is sufficiently small.

The boarding event determination unit 36 determines whether there is a boarding event from the various items of sensor information transmitted from the vehicle state sensor 13, and transmits the information about the existence of a boarding event to the suitability determination unit 38.

For example, the boarding event determination unit 36 can determine, based on door open/close information transmitted from the vehicle state sensor 13, that there has been a boarding event when a door has been opened or closed during a stop. The time (e.g., three seconds) required for an occupant to board can be defined, and it can be determined that a boarding event has occurred when a door has been kept open for a time required for an occupant to board, or longer. It is thereby possible to eliminate falsely sensing, as a boarding event, re-closing the door or another door opening/closing event that is not boarding.

In regard to door opening/closing, it is possible to use the information of any door of the vehicle 2, but when, e.g., the vehicle 2 is a business vehicle such as a taxi, the boarding event determination unit 36 can determine that a boarding event has occurred based on opening/closing of a door other than that of where the driver is seated.

Also, for example, the boarding event determination unit 36 can determine, using seatbelt fastening information sent by the vehicle state sensor 13, that there has been a boarding event when a seatbelt has been fastened. Alternatively, it is possible to determine, using seating sensor information, that there has been a boarding event when the number of seated occupants has increased. It is also possible to determine, using sensing results of occupant sensing means by camera, that there has been a boarding event when the number of seated occupants has increased.

Furthermore, when the vehicle 2 is a vehicle dispatch service vehicle that is dispatched in accordance with a vehicle dispatch request from a user, the boarding event determination unit 36 can determine that there has been a boarding event when the vehicle 2 has traveled toward a vehicle dispatch location by an instruction from the vehicle dispatch service, the vehicle 2 has actually stopped, and user authentication or another boarding process has taken place.

The suitability determination unit 38 sets the stop position of the vehicle 2 as a boarding position candidate based on stop information (stop occurrence, stop time) transmitted from the stop determination unit 32, position information of the vehicle 2 transmitted from the host-vehicle position recognition unit 34, and information of occurrence/non-occurrence of a boarding event transmitted from the boarding event determination unit 36.

For example, the suitability determination unit 38 determines that the stop position is suitable for boarding and sets the stop position as a boarding position candidate when the stop time at a stop position of the vehicle 2 is a predetermined length of time or greater. The predetermined time can be set to be 30 seconds.

The aforementioned predetermined time set in order to determine whether a stop position is suitable for boarding can be set in the suitability determination unit 38 as equal to the sum of e.g., "a time over which the vehicle stands by until the occupant starts boarding" and "a time until the occupant completes boarding."

Here, "a time over which the vehicle stands by until the occupant starts boarding" is the time of continuous waiting for the user when the vehicle of the vehicle dispatch service has arrived at the stop location earlier than the user. "A time over which the vehicle stands by until the occupant starts boarding" can be set to, e.g., one minute.

Moreover, "a time until the occupant completes boarding" is the time required for the dispatched vehicle to be recognized after the user has arrived at the boarding point, for completion of boarding of the vehicle, and for the vehicle to begin departure. "A time until the occupant completes boarding" can be derived by actual measurement, or can be set to, e.g., 30 seconds.

When a vehicle dispatch service is to be provided, the stop needs to be continued for a length of time that is the sum of at least "a time over which the vehicle stands by until the occupant starts boarding" and "a time until the occupant completes boarding" at the boarding position. Accordingly, when the vehicle 2 has stopped at a certain stop position, a condition that is preferably used is that the stop time at the stop position be greater than the sum of "a time over which the vehicle stands by until the occupant starts boarding" and "a time until the occupant completes boarding" in order to determine whether the stop position is suitable as a boarding position for use in a vehicle dispatch service.

For example, the suitability determination unit 38 can access the map database 20, read out traffic rules and other stop possibility information on a road map at the stop position of the vehicle 2, and determine whether stopping at the stop position is possible based on the stop possibility information. In this case, when stopping at the stop position has been determined to be impossible based on the stop possibility information, it is determined that the stop position is unsuitable for boarding, and the stop position can remain unset as a boarding position candidate.

The stop possibility information includes information about whether, for each lane, a road shoulder is a possibility for a stop, as well as information about intersections, pedestrian crossings, fire hydrants, and other objects and target geographical features at which a stop is prohibited within a certain distance. Therefore, the stop possibility information is read out from the map database 20 using the identification information of the lane in which the vehicle 2 is positioned and the position information of the vehicle 2, and when a stop at the stop position is prohibited based on the stop possibility information, the stop position can be determined to be unsuitable for boarding.

Processing Procedure for Calculating Boarding Position

Figure 3:
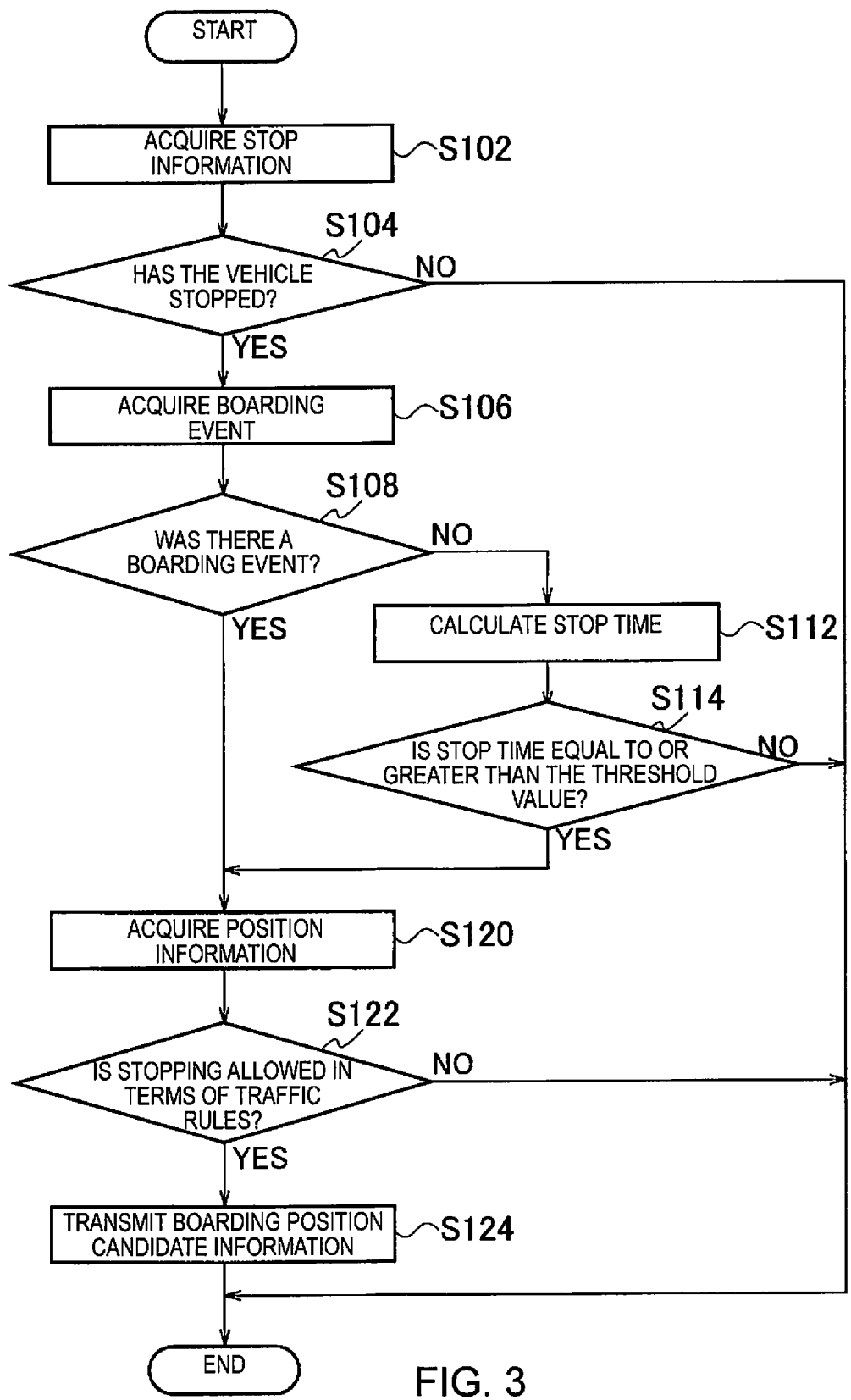
FIG. 3 is a flow chart showing a processing procedure of the boarding position calculation according to an embodiment of the present invention.

Described next with reference to the flowchart of FIG. 3 is a processing procedure for the boarding position calculation according to the present embodiment. FIG. 3 is a flow chart showing the processing procedure of the boarding position calculation according to the present embodiment, and is particularly a flowchart showing the processing in the vehicle-side controller 30. The processing of boarding position calculation shown in FIG. 3 is started when the ignition of the vehicle 2 is switched on, and is repeatedly executed while the ignition remains on.

First, in step S102, the vehicle-side controller 30 acquires vehicle information by using the acquisition unit 10. In step S104, it is determined whether the vehicle 2 has stopped based on the vehicle information.

When it has been determined that the vehicle 2 has not stopped (NO in step S104), the processing of the boarding position calculation is ended.

On the other hand, when it has been determined that the vehicle 2 has stopped (YES in step S104), the vehicle-side controller 30 acquires, in step S106, a boarding event based on the vehicle information, and in step S108, it is determined whether there has been a boarding event.

When it has been determined that there has not been a boarding event (NO in step S108), the process proceeds to step S112, and when it has been determined that there has been a boarding event (YES in step S108), the process proceeds to step S120.

The vehicle-side controller 30 calculates that stop time of the vehicle 2 in step S112, and determines whether the stop time is a predetermined threshold value or greater in step S114.

When the stop time of the vehicle 2 is less than the predetermined threshold value (NO in step S114), the processing of the boarding position calculation is ended. On the other hand, when the stop time of the vehicle 2 is the predetermined threshold value or greater (YES in step S114), the process proceeds to step S120.

The vehicle-side controller 30 acquires position information that includes the stop position of the vehicle 2 in step S120, and determines in step S122 whether a stop is possible at the stop position based on traffic rules and other stop possibility information.

When it has been determined, based on the stop possibility information, that a stop at the stop position of the vehicle 2 is not possible (NO in step S122), the process of the boarding position calculation is ended. On the other hand, when it has been determined that a stop is possible at the stop position of the vehicle 2 (YES in step S122), the process proceeds to S124, and the vehicle-side controller 30 sets the stop position as a boarding position candidate, and transmits the boarding position candidate information containing the information about the boarding position candidate to the vehicle-side communication module 40.

In the description above, an example was shown in which the vehicle-side controller 30 makes both a determination by a boarding event (steps S106, S108) and a determination by the stop time of the vehicle (steps S112, S114), but it is also possible to make a determination using only one of the two determinations. Furthermore, the vehicle-side controller 30 can also omit a determination (step S122) based on traffic rules and other stop possibility information.

Configuration of the Server-Side Controller

Described next with reference to FIG. 1 are the functions of the server-side controller 70.

As shown in FIG. 1, the server-side controller 70 is provided with a boarding position calculation unit 72 (calculation unit, calculation means) as an information processing circuit.

The boarding position calculation unit 72 decides a boarding position based on boarding position candidate information stored in the boarding position candidate database 60, and transmits to the boarding position database 80 the boarding position information containing information related to the decided boarding position.

Specifically, after the boarding position candidate is newly registered in the boarding position candidate database 60, the boarding position calculation unit 72 searches for the boarding position registered in the boarding position database 80 based on the identification information of the lane in which the boarding position candidate exists.

When there is no boarding position existing in the same lane as the boarding position candidate, or when there is no boarding position in which, among the boarding positions existing in the same lane as the boarding position candidate, the distance between the boarding position candidate is within a predetermined distance (e.g., 3 m), the boarding position calculation unit 72 decides the boarding position candidate to be a new boarding position. The boarding position database 80 stores the new boarding position decided by the boarding position calculation unit 72.

When a boarding position is to be stored, the boarding position database 80 can store the boarding position as an alighting position. For example, when four items, namely, the position information, identification information of the lane to which the stop position belongs, boarding possibility, and alighting possibility, are stored in the boarding position database 80 as a single set of data, the boarding possibility item can be stored as "possible" and in conjunction therewith, the alighting possibility item can be stored as "possible."

Moreover, the boarding position calculation unit 72 can cluster together a plurality of boarding position candidates to calculate a representative position, and the boarding position database 80 can store the representative position as a boarding position.

Specifically, after having extracted boarding position candidates having the same lane identification information from the boarding position candidate database 60, it is also possible to cluster together a space distribution of boarding position candidates based on the position information of the boarding position candidates, and calculate a representative position for each cluster as a boarding position. Any clustering technique can be used, and it is possible to use, e.g., K-means clustering.

When there is a plurality of boarding position candidates having the same lane identification information, clustering parameters can be adjusted so that the representative positions of each cluster are separated by a predetermined distance or greater (e.g., 3 m or more) from each other. Also, the average of space coordinates of the boarding position candidates classified into the same cluster can be calculated as the representative position, and the representative position can be calculated based on a median value of the boarding position candidates. Alternatively, it is also possible to use another technique such as removing outliers and taking the average value of remaining data.

Moreover, when a boarding position is to be stored, the boarding position database 80 can tie information about a time band suitable for boarding to the boarding position and store the boarding position. For example, time is divided into time bands of morning (4 to 10 o'clock), afternoon (10 to 16 o'clock), evening (16 to 22 o'clock), and night (22 to 4 o'clock), and the boarding position candidates classified into the same cluster are furthermore classified into each time band based on the stop time of day of the vehicle 2. As a result of classification, the boarding position database 80 can store a time band, for which there is even one boarding position candidate, as a time band in which boarding is possible. The method for classifying the time bands indicated herein and the technique for assessing boarding possibility are examples, and another technique can be used.

The boarding position database 80 can furthermore store only boarding positions decided based on boarding position candidates related to a vehicle which performs at least any of transportation of occupants, delivery of cargo, and collection of cargo, from among the boarding position candidates stored in the boarding position candidate database 60. For example, it is possible to store only boarding positions decided based on boarding position candidates related to a taxi, kindergarten bus, vehicle dispatch business vehicle, garbage truck, and other vehicles that do not park, but stop, and open and close a door when arriving as a destination.

In addition to the above, it is possible to calculate an output error when training data has been inputted to a neural network such as in deep learning (machine learning) using a neural network, and adjust various parameters of the neural network to minimize the error, whereby a relationship between a boarding position that is frequently selected by a user and the vehicle information of the vehicle 2 is learned, and the boarding position is decided based on the learning result.

Example of Usage in a Vehicle Dispatch System

Figure 4:
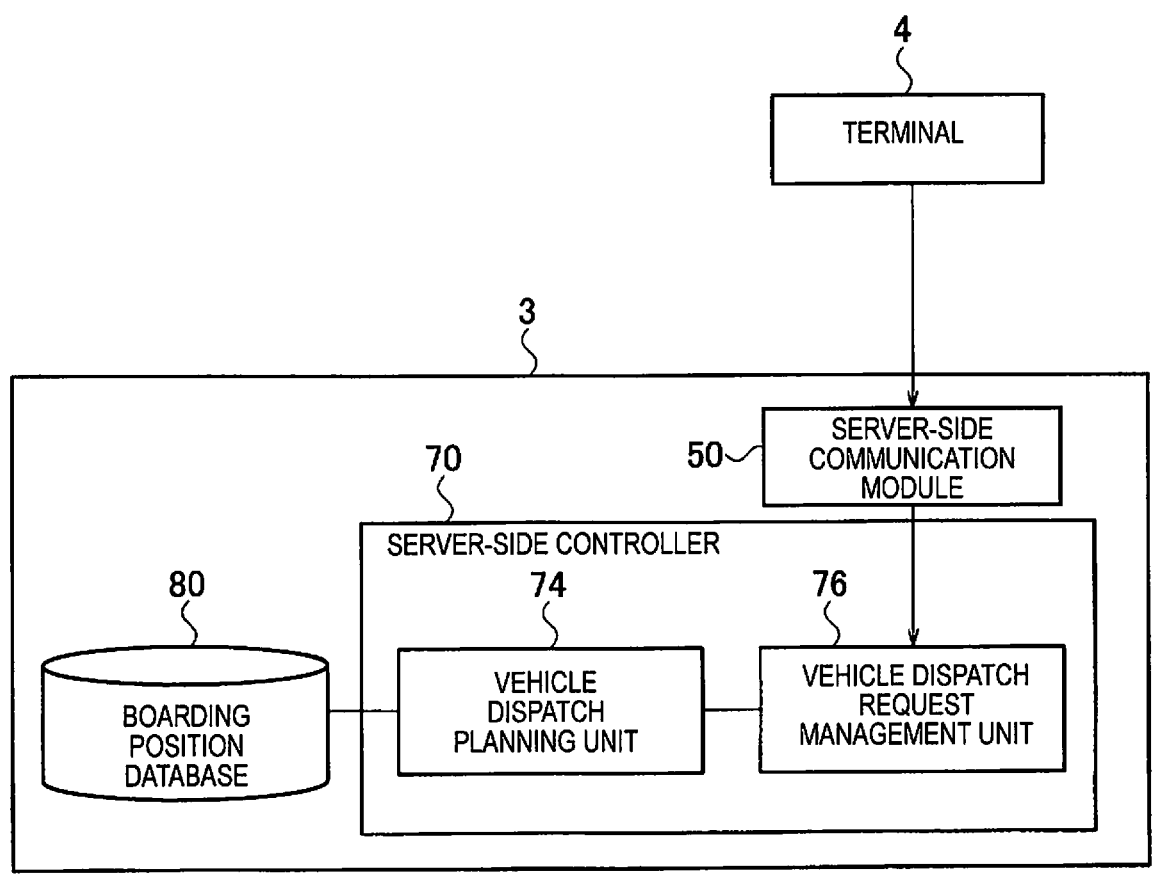
FIG. 4 is a block diagram showing a configuration of a vehicle dispatch system in which a boarding position obtained by the boarding position calculation system of FIG. 1 is used.

Described next with reference to FIG. 4 is an example of using the boarding position calculation system according to the present embodiment in a vehicle dispatch system. FIG. 4 is a block diagram showing a configuration of the vehicle dispatch system in which a boarding position obtained by the boarding position calculation system of FIG. 1 is used.

As shown in FIG. 4, the vehicle dispatch system is provided with a server 3 and a terminal 4. When the server 3 is used as a part of a vehicle dispatch system, the server-side controller 70 is provided with a vehicle dispatch planning unit 74 (planning unit, planning means) and a vehicle dispatch request management unit 76 (management unit, management means) as the plurality of information processing circuits. In the server 3, the server-side communication module 50 and the boarding position database 80 are the same components as shown in FIG. 1.

It is assumed that the boarding position, alighting position, and the like calculated by the boarding position calculation described above have already been stored in the boarding position database 80.

The terminal 4 receives a vehicle dispatch request from a user, and transmits the vehicle dispatch request to the server-side communication module 50 in the server 3. For example, the terminal 4 can be a smartphone, tablet PC, or other mobile terminal, etc., and an application can operate to request a vehicle dispatch made by the user desiring a vehicle dispatch request. The terminal 4 is connected to the server 3 via 4G/LTE or other mobile communication function, and Wi-Fi or other communication means, and transmits the vehicle dispatch request to the vehicle dispatch request management unit 76 based on input from the user. Also, the terminal 4 receives the vehicle dispatch information from the server-side communication module 50, and presents the vehicle dispatch information to the user.

Additionally, the method for receiving a vehicle dispatch request from a user and the method for presenting vehicle dispatch information to the user is not limited to the use of an application that operates on the terminal 4, and also possible are, e.g., a method that uses a web application, and other methods of implementation.

A vehicle dispatch request received from the user includes at least a starting point and a destination. Here, the destination is set by input from the user. On the other hand, the starting point can be set to the current location of the user, and can be set by input from the user. Additionally, the vehicle dispatch request can furthermore include designation of transit points, designation of boarding and alighting positions, number of passengers, reservation time, possibility of carpooling, and other additional information.

The vehicle dispatch information presented to the user includes at least boarding position, alighting position, current position of the dispatched vehicle, and information for identifying the dispatched vehicle. Additionally, the vehicle dispatch information can furthermore include the time at which the vehicle will arrive at the boarding position, the movement time from the boarding position to the alighting position, and a recommended walking route for the user to move to the boarding position, and other added information.

The vehicle dispatch request management unit 76 receives a vehicle dispatch request transmitted from the terminal 4 via the server-side communication module 50, and transmits the vehicle dispatch request to the vehicle dispatch planning unit 74. Also, the vehicle dispatch request management unit 76 receives the vehicle dispatch information including the vehicle dispatch plan from the vehicle dispatch planning unit 74, and transmits the vehicle dispatch information to the terminal 4 via the server-side communication module 50.

The vehicle dispatch planning unit 74 calculates a vehicle dispatch plan based on the vehicle dispatch request transmitted from the vehicle dispatch request management unit 76, the boarding position database 80, and the vehicle information for the vehicle dispatch system that is under the management of the vehicle dispatch system. The vehicle dispatch planning unit 74 transmits the vehicle dispatch information including the calculated vehicle dispatch plan to the vehicle dispatch request management unit 76. Also, the vehicle dispatch planning unit 74 gives a vehicle dispatch instruction to the vehicle dispatch system vehicle that is under the management of the vehicle dispatch system.

The vehicle dispatch plan includes at least the vehicle linked to the vehicle dispatch request, and the boarding and alighting positions of the user. The vehicle dispatch planning unit 74 selects the boarding position nearest to the starting point included in the vehicle dispatch request, and selects the alighting position nearest to the destination included in the vehicle dispatch request, by using the starting position and destination included in the vehicle dispatch request and information about the boarding position and the alighting position included in the boarding position database 80. The vehicle dispatch planning unit 74 extracts a vehicle capable of receiving the vehicle dispatch request from among the vehicles of the vehicle dispatch system, and decides on the vehicle nearest to the selected boarding position as the vehicle linked to the vehicle dispatch request. In this manner, the vehicle dispatch planning unit 74 creates a vehicle dispatch plan.

The method of creating a vehicle dispatch plan in the vehicle dispatch planning unit 74 is not limited to be method described above, and another method can be used.

Effects of the Embodiments

As described in detail above, in accordance with the boarding position calculation method, boarding position calculation device, and boarding position calculation system according to the present embodiment, vehicle information including the position information of the vehicle is acquired, a stop position of a vehicle is recognized based on the vehicle information, a determination is made about whether the stop position is suitable for boarding based on a stop time of the vehicle or occurrence of a boarding event of the vehicle at the stop position, and when the stop position is determined to be suitable for boarding, the stop position is stored as a boarding position in the vehicle dispatch service.

It is thereby determined whether the stop position is suitable for boarding based on a result of a stop by a vehicle driven by a driver, and it is therefore possible to utilize the assessment of a stop position by a driver based on various factors (the existence of a guide rail, fence, etc.) that differ for each location. Accordingly, a location suitable for boarding can be calculated at low cost in the vehicle dispatch service as long as there is vehicle stop information and boarding event data.

Figure 5:
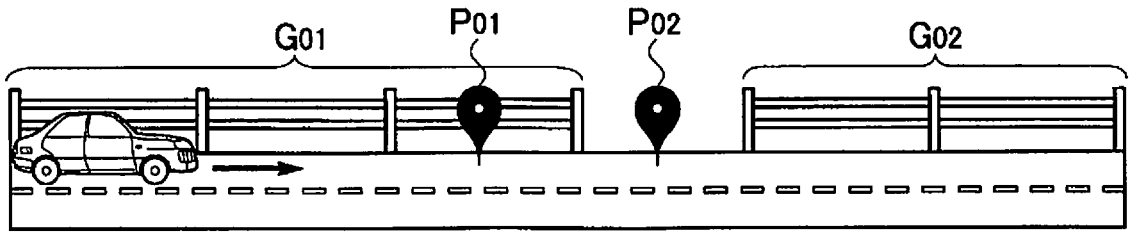
FIG. 5 is a first depiction showing an example of the distribution of stop positions.

A case shall be assumed in which, e.g., it has been determined that the vehicle has stopped at a stop position P01 and a stop position P02, as shown in FIG. 5. When the vehicle has stopped at the stop position P01, movement for a person is difficult between the road and the sidewalk due to the presence of a guide rail G01. Accordingly, boarding or alighting is difficult for a vehicle stopped at the stop position P01. On the other hand, when the vehicle has stopped at the stop position P02, movement by a person is easy between the road and the sidewalk because there is a space between the guide rail G01 and a guide rail G02. Accordingly, boarding or alighting is easy for a vehicle stopped at the stop position P02.

In accordance with the boarding position calculation method, boarding position calculation device, and boarding position calculation system according to the present embodiment, the stop position P02 is determined to be suitable for boarding based on the fact that a boarding event at the stop position P02 can readily occur in comparison with a boarding event at the stop position P01. Thus, the stop position can be determined to be suitable for boarding based on the stop position of the vehicle and a boarding event at the stop position, and a location suitable for boarding can therefore be calculated at low cost in the vehicle dispatch service as long as there is vehicle stop information and boarding event data.

In accordance with the boarding position calculation method, boarding position calculation device, and boarding position calculation system according to the present embodiment, the stop position of a vehicle that carries out at least any of transportation of occupants, delivery of cargo, and collection of cargo is stored as a boarding position in the vehicle dispatch service. For example, the stop position of a taxi, delivery vehicle, garbage truck, etc., can be stored as a boarding position in the vehicle dispatch service. In comparison with a common vehicle, these vehicles stop at a destination and have a high frequency of opening and closing a door, and data for calculating a location suitable for boarding can therefore be efficiently collected.

The stop position of a vehicle that carries out at least any of transportation of occupants, delivery of cargo, and collection of cargo is often a location suitable for boarding in comparison with the boarding position of a common vehicle, and highly precise data can be collected as data for calculating a location suitable for boarding. As a result, the boarding position in a vehicle dispatch service can be calculated with greater accuracy.

Furthermore, in accordance with the boarding position calculation method, boarding position calculation device, and boarding position calculation system according to the present embodiment, a vehicle dispatch location included in a vehicle dispatch request to the vehicle dispatch service is acquired as the vehicle information, and when occupants have boarded the vehicle dispatched based on the vehicle dispatch request at the vehicle dispatch location, the vehicle dispatch location is determined to be suitable for boarding. The vehicle information of the vehicle dispatched by the vehicle dispatch service is used, and it is therefore possible to reliably extract a location having an actual result of a boarded user in the vehicle dispatch service, and data for calculating a location suitable for boarding can be efficiently collected.

Moreover, in accordance with the boarding position calculation method, boarding position calculation device, and boarding position calculation system according to the present embodiment, when the stop time is a predetermined time or greater, the stop position can be determined to be suitable for boarding. Accordingly, it is possible to ensure that the stop position is a location suitable for boarding, at least from the viewpoint of the possible stop time.

Furthermore, in accordance with the boarding position calculation method, boarding position calculation device, and boarding position calculation system according to the present embodiment, when a sum of a standby time of the vehicle until an occupant starts boarding and a time until the occupant completes boarding is used as the predetermined time, it can be determined that the stop position is suitable for boarding when the stop time is the predetermined time or greater. Accordingly, a location that satisfies a maximum stop time required by the vehicle dispatch service can be stored as a boarding position.

Moreover, in accordance with the boarding position calculation method, boarding position calculation device, and boarding position calculation system according to the present embodiment, whether the door of the vehicle is opened or closed is acquired as vehicle information, and when the door has opened or closed at the stop position, it can be deemed that a boarding event has occurred, and the stop position can be determined to be suitable for boarding. Accordingly, a location where a person has actually boarded and alighted at the stop position can be stored as a boarding position.

Furthermore, in accordance with the boarding position calculation method, boarding position calculation device, and boarding position calculation system according to the present embodiment, boarding by an occupant in a vehicle can be sensed, and when the boarding of an occupant has been sensed, a boarding event is deemed to have occurred, and the stop position can be determined to be suitable for boarding. Accordingly, it is possible to determine that a stop position is suitable for boarding after an actual boarding result by an occupant has been accurately detected, and it is possible to more accurately determine that the stop position is a place suitable for boarding.

Moreover, in accordance with the boarding position calculation method, boarding position calculation device, and boarding position calculation system according to the present embodiment, possibility of a stop at the stop position is determined based on stop possibility information on a road map, and when stopping at a stop position is not possible, the stop position can be determined to be unsuitable for boarding. Accordingly, it is possible to suppress a stop position which is based on an act that is not permitted in terms of the stop possibility information from being stored as a boarding position.

Figure 6:
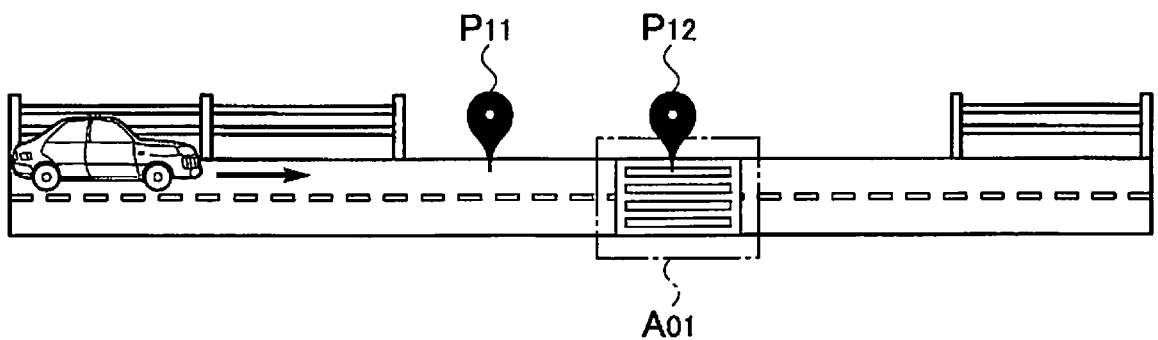
FIG. 6 is a second depiction showing an example of the distribution of stop positions.

For example, a case shall be assumed in which it has been determined that the vehicle has stopped at a stop position P11 and a stop position P12, as shown in FIG. 6. If the vehicle stops at either the stop position P11 or the stop position P12, it is easy for a person to move between the road and the sidewalk, and a boarding event can therefore occur at either the stop position P11 or the stop position P12.

However, there is a problem in terms of traffic rules when it is determined that the stop position P12 is suitable for boarding merely because the vehicle stopped at a position that belongs to a stop prohibited area A01 such as the stop position P12 and a boarding event occurred when the vehicle stopped at the stop position P12. FIG. 6 shows an example in which the stop prohibited area A01 is a crosswalk, and an example of stopping at such a location could occur when the vehicle is, e.g., a taxi.

Therefore, it is determined whether the stop position is suitable for boarding based on traffic rules on a road map and other stop possibility information, and when a stop is not possible at a stop position, it is determined that the stop position is unsuitable for boarding, thereby making it possible to suppress a stop position which is based on an act that is not permitted in terms of the stop possibility information from being stored as a boarding position.

Furthermore, in accordance with the boarding position calculation method, boarding position calculation device, and boarding position calculation system according to the present embodiment, a plurality of boarding position candidates determined to be suitable for boarding can be clustered together to calculate a representative position, and the representative position can be stored as a boarding position. The final boarding position is calculated by clustering based on information from not only a single vehicle, but rather information from a plurality of vehicles, and the effect of an outlier value can therefore be minimized or the outlier value can be eliminated, and locations suitable for boarding can be calculated as stop positions.

Figure 7:
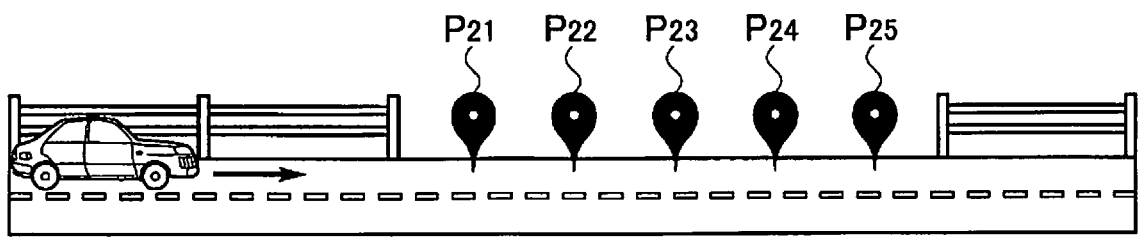
FIG. 7 is a third depiction showing an example of the distribution of stop positions.

Additionally, for example, assume the case in which it has been determined that the vehicle has stopped at stop positions P21 to P25, as shown in FIG. 7. When the stop positions P21 to P25 are distributed in concentrated fashion in a relatively narrow area, even if all of the stop positions P21 to P25 are locations that are suitable for boarding, storing all of the stop positions P21 to P25 in the boarding position database is not advantageous from the aspect of suppressing the amount of data stored in the boarding position database.

In such a case, the representative position can be calculated based on the stop positions P21 to P25 (or, for example, the stop position P23, which is the average position among the stop positions P21 to P25, can be selected), and the representative position can be stored as the boarding position. It is thereby possible to suppress an increase in the number of data items of the stop positions that are to be stored the boarding position database, and installation costs and maintenance costs can be suppressed by suppressing the size of the boarding position database 80.

Moreover, in accordance with the boarding position calculation method, boarding position calculation device, and boarding position calculation system according to the present embodiment, a time band suitable for boarding can be linked to a boarding position and stored. Accordingly, it is possible to handle a case in which the condition of whether suitability for boarding changes depending on the time band. Furthermore, using information about the time band linked to the boarding position and stored when the boarding position is to be selected in the vehicle dispatch service makes it possible to select a more suitable boarding position.

Furthermore, in accordance with the boarding position calculation method, boarding position calculation device, and boarding position calculation system according to the present embodiment, a stop position determined to be suitable for boarding can be stored not only as a boarding position, but also as an alighting position. Registering a stop position, which has been determined to be suitable for boarding, as an alighting position as well makes it possible to increase not only the number of boarding positions, but also the number of alighting positions in the vehicle dispatch service.

In the case of boarding, waiting time can occur when either the user of the boarding service or the dispatched vehicle arrives earlier. The waiting time can occur in order for the user and the dispatched vehicle to identify each other. On the other hand, when alighting occurs, the occupant merely alights, and the stop time for alighting therefore tends to be shorter than for boarding. Therefore, the stop position where boarding is possible can be determined to be a stop position where alighting is possible.

Furthermore, in accordance with the boarding position calculation method, boarding position calculation device, and boarding position calculation system according to the present embodiment, when used in a vehicle dispatch service, a vehicle dispatch request from a user of the vehicle dispatch service is received, the boarding and alighting positions of the user are decided based on the vehicle dispatch request, and a selection is made from among the stored boarding positions to decide the boarding position. A vehicle can be dispatched using a boarding position stored in the boarding position database, and therefore, when the dispatched vehicle has arrived at the vehicle dispatch location, a user can be allowed to board or alight in a location suitable for boarding without small corrections to the stop position in the vehicle dispatch location. As a result, even when a vehicle dispatch system is provided using a vehicle in which the location cannot be finely corrected for stop position by driver assessment, such as in a driverless vehicle, the vehicle can be stopped in a stop position suitable for boarding and alighting without causing the user to feel inconvenience when boarding and alighting.

Modifications

Figure 8:
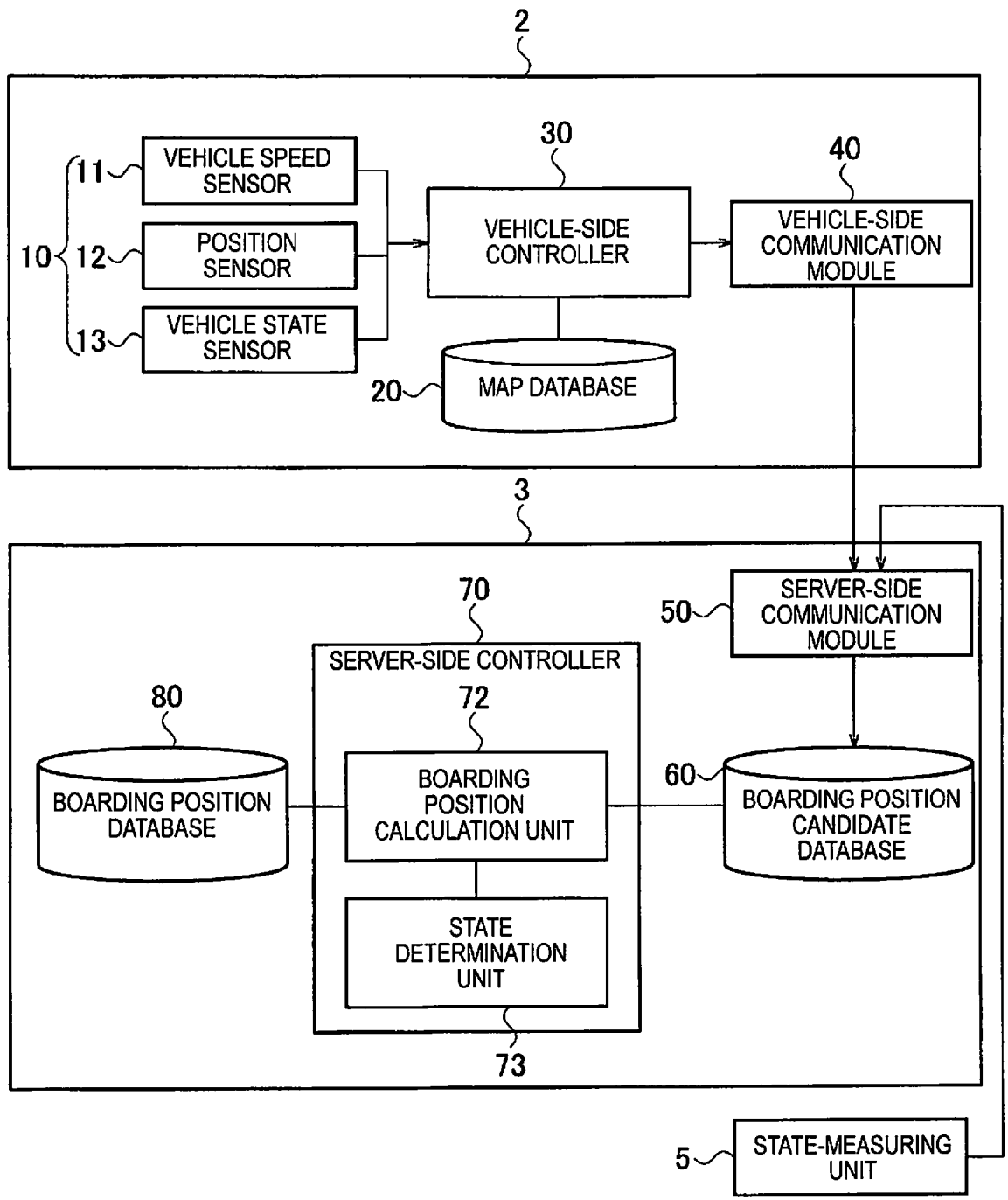
FIG. 8 is a block diagram showing a configuration of the boarding position calculation system according to a modification of an embodiment of the present invention.

Described next are modifications of the boarding position calculation system described above. FIG. 8 is a block diagram showing a configuration of the boarding position calculation system according to a modification. Unlike the boarding position calculation system shown in FIG. 1, the boarding position calculation system shown in FIG. 8 is has a state-measuring unit 5 (measuring unit) connected to the server 3, and the server-side controller 70 is provided with a state determination unit 73 (state determination unit, state determination means) as an information processing circuit.

The state-measuring unit 5 is configured from a group of sensors that measure information about boarding position surroundings. Examples of the information about the boarding position surroundings include photographic data in which an area that includes the boarding position has been photographed, data concerning a coefficient of friction of a road surface, data concerning moisture content of the road surface, and temperature data of the road surface. The information about the surroundings is not limited to these forms of data. The state-measuring unit 5 is configured from a camera for photographing the boarding position and the surroundings of the boarding position, a friction sensor for measuring the magnitude of the road surface friction, a moisture amount sensor for measuring the moisture content of the road surface, a temperature sensor for measuring the road surface temperature, and other measuring components. The sensors constituting the state-measuring unit 5 are not limited to these sensors.

The friction sensor can be a strain gauge, and can be a sensor that measures a slip ratio of a tire of the vehicle. The moisture amount sensor for measuring the moisture content of the road surface can be a sensor based on spectral reflection characteristics of the road surface.

Additionally, the information about the boarding position surroundings can include visual observation data at the boarding position. In this case, the state-measuring unit 5 comprises an input device for receiving results of confirmation by visual observation by a worker who has confirmed the state of the boarding position by visual observation.

Moreover, the state-measuring unit 5 can be a sensor mounted in the vehicle, and can be a sensor installed in the road where the boarding position is located.

The state determination unit 73 determines the state of the boarding position based on the information about the surroundings acquired by the state-measuring unit 5.

The determination of the state of the boarding position by the state determination unit 73 will be described. For example, when the information about the surroundings is photographic data in which an area that includes the boarding position has been photographed, the state determination unit 73 determines, based on the photographic data, whether there is a parked vehicle, an abandoned bicycle, a suspicious object, garbage, or other obstacle present at the boarding position.

Moreover, the state determination unit 73 can determine, based on the photographic data, the presence of a crowd of people at the boarding position or in the vicinity thereof, and the extent of the crowd of people (degree of crowding per unit of area, amount of foot-traffic per unit of time) due an event, an altercation, or other cause. Furthermore, the state determination unit 73 can determine whether there is a lane prohibited from travel by the vehicle due to a traffic accident, construction, etc., on the road that includes the boarding position, and can determine whether traffic flow is occurring in alternating fashion.

Additionally, the state determination unit 73 can determine the presence of sunlight at the boarding position based on the photographic data.

When the information about the surroundings is data about the friction coefficient of the road surface, the state determination unit 73 determines a freezing state of the road surface. For example, when the friction coefficient is less than 0.3, the road surface is determined to be in a freezing state, when the friction coefficient is 0.3 or greater and less than 0.6, the road surface is determined to be in a wet state, and when the friction coefficient is 0.6 or greater, the road surface is determined to be in a normal state.

When the information about the surroundings is data about the moisture content of the road surface at the boarding position, the state determination unit 73 determines existence of slush or water pooling on the road surface. For example, when the moisture content is at a predetermined threshold value or higher, the road surface is determined to be slushy or to have pools of water, and when the moisture content is less than the predetermined threshold value, the road surface is determined not to be slushy or have pools of water. Additionally, it is possible to calculate an index value (hardness) that represents the hardness of the road surface in which the greater the moisture content is the smaller the index value is.

When the information about the surroundings is temperature data of the road surface, the state determination unit 73 determines the freezing state of the road surface. For example, when the road surface temperature is less than 0° C., it is determined that the road surface is in a freezing state, and when the road surface temperature is 0° C. or higher, it is determined that the road surface is not in a freezing state.

Moreover, the state determination unit 73 acquires regional information of a region that includes the boarding position from an external server, etc., via the server-side communication module 50, and the state of the boarding position can be determined based on the regional information. Examples of regional information include meteorological data (regional rainfall amount, sunlight, temperature, humidity, wind speed, and other data, as well as forecast data) provided by meteorological organizations, and regional event information (event location, date, time, type, number of attendees, and other data) collected and provided by travel agencies and the like. The regional information acquired by the state determination unit 73 is not limited to these forms of data.

The state determination unit 73 can determine the state of the boarding position based on a combination of various physical values obtained from the information about the surroundings, and can determine the state of the boarding position based on a combination of the information about the surroundings and the regional information. The state determination unit 73 can form a model of a correlation seen between a plurality of data constituting the information about the surroundings and the regional information, and determine the state of the boarding position based on the model. Moreover, the state of the boarding position can be determined based on deep learning that uses a neural network in which a plurality of data constituting the information about the surroundings and the regional information are used as input data.

Furthermore, the state determination unit 73 can predict information about the surroundings based on chronological changes in the information about the surroundings, and can predict the state of the boarding position based on the predicted information about the surroundings. In other words, it is possible to save the information about the surroundings over a fixed period of time in the past in the boarding position database 80, calculate the chronological changes of the information about the surroundings, predict the information about the surroundings from a current time to a predetermined time in the future, and predict the state of the boarding position based on the predicted information about the surroundings.

The prediction of future information about the surroundings based on chronological changes in the information about the surroundings can be, e.g., a prediction of future information about the surroundings using linear extrapolation on a graph chronological changes, and can be a prediction of future information about the surroundings based on modeling characteristics of changes over time in the information about the surroundings. Moreover, future information about the surroundings can be predicted based on deep learning that uses a neural network in which chronological changes in the information about the surroundings is used as input data.

Moreover, the state determination unit 73 can hold the determination result of the state of the boarding position over a fixed period of time in the past in the boarding position database 80, calculate the chronological changes in the state of the boarding position, and predict the state of the boarding position from the current time to a predetermined time in the future.

The prediction of a future state of a boarding position based on chronological changes in the state of the boarding position can be, e.g., a prediction of the future state of the boarding position using linear extrapolation on a graph of chronological changes, and can be a predication of the future state of the boarding position based on modeling characteristics of changes over time in the state of the boarding position. Moreover, the future state of the boarding position can be predicted based on deep learning that uses a neural network in which chronological changes in the state of the boarding position are used as input data.

The state of the boarding position determined or predicted by the state determination unit 73 is linked to the boarding position and stored in the boarding position database 80 in the manner described above. The state of the determined or predicted boarding position can be outputted to the exterior of the server 3 in accordance with a vehicle dispatch request.

Effects of the Modifications

In accordance with the boarding position calculation method, boarding position calculation device, and boarding position calculation system according to the present embodiment, information about the surroundings of a boarding position is acquired, a state of the boarding position is determined based on the information about the surroundings, and the determined state can be linked to the boarding position and stored. For example, the state of the boarding position varies from time to time, and in particular, the state of the boarding position at the time the vehicle dispatch system is used can reduce usability by the user, but because the state of the boarding position is determined and stored based on the information about the surroundings of the acquired boarding position, the vehicle dispatch service can be provided with consideration given to the state of the boarding position. In particular, a boarding position that is unsuitable for providing a vehicle dispatch service can be eliminated based on the determined state of the boarding position.

Moreover, in accordance with the boarding position calculation method, boarding position calculation device, and boarding position calculation system according to the present embodiment, information about the surroundings can be acquired by a measuring unit mounted in the vehicle. Using an onboard sensor or an onboard camera as the measuring unit makes it possible to acquire information about the boarding position surroundings on the road where a vehicle has actually traveled, and the state of the boarding position can be ascertained in real time based on actual results, namely, the travel data of a vehicle.

Furthermore, in accordance with the boarding position calculation method, boarding position calculation device, and boarding position calculation system according to the present embodiment, information about the surroundings can be acquired by a measuring unit installed in the road where the boarding position is located. The measuring unit can be installed in a location where information about the surroundings is readily acquired, and since measurement precision can be improved when information about the surroundings is acquired, precision for determining the state of a boarding position can be improved. Moreover, in comparison with the case in which the measuring unit is mounted in a vehicle, installing the measuring unit in the road fixes the installation location, and the conditions for acquiring the information about the surroundings by the measuring unit are made uniform and a comparison between a plurality of acquired sets of information about the surroundings is facilitated.

Moreover, in accordance with the boarding position calculation method, boarding position calculation device, and boarding position calculation system according to the present embodiment, information about the surroundings can be predicted based on chronological changes in the information about the surroundings, and the state of the boarding position can be predicted based on the predicted information about the surroundings. Moreover, the state of the boarding position can be predicted on the basis chronological changes in the state of the boarding position. Even when the information about the surroundings at the current time cannot be acquired, as long as there are sets of information about the surroundings successfully acquired in that past, the information about the surroundings at the current time can be estimated based on these sets of past information about the surroundings. As a result, the state of a boarding position can be calculated based on the estimated information about the surroundings. Moreover, the future state of the information about the surroundings can be predicted because changes in the information about the surroundings can be predicted into the future.

Moreover, in accordance with the boarding position calculation method, boarding position calculation device, and boarding position calculation system according to the present embodiment, regional information about a region that includes the boarding position can be acquired and the state of the boarding position can be determined based on the regional information. Using regional meteorological data and regional event information as regional information in the determination of the state of the boarding position makes it possible to improve the precision of the determination of the state of the boarding position in comparison with a determination solely from information about the surroundings. Moreover, using forecast data of meteorological data, future event information, and other regional information makes it possible to improve the forecast precision of the future state of the boarding position.

The functions shown in the embodiments above can be implemented by one or more processing circuits. The term 'processing circuit' includes a programmed processor, an electrical circuit, etc., and furthermore includes a device such as an application-specific integrated circuit (ASIC), circuit-configured elements arranged so as to execute described functions, and other configurations.

The details of the present invention have been described above following the embodiments, but the present invention is not limited to these descriptions, it being obvious to a person skilled in the art that various modifications and improvements are possible. The discussion and drawings constituting a part of this disclosure should not be understood as limiting the invention. From this disclosure, various alternative embodiments, examples, and operation techniques will be apparent to a person skilled in the art.

As shall be apparent, the present invention includes various embodiments and the like not described herein. Therefore, the technical scope of the present invention is established only by invention-defining matter in accordance with the scope of claims reasonable from the above description.

The invention claimed is:

1. A boarding position setting method comprising
using at least one sensor provided in a vehicle and a computer device including a processor and a storage to carry out the following:
transmitting vehicle information from the at least one sensor to the computer device, the vehicle information including position information of the vehicle, a vehicle speed of the vehicle, and at least one of an open/close state of a door of the vehicle and a detection result of whether an occupant has become seated in the vehicle;
recognizing a stop position of the vehicle based on the vehicle speed transmitted from the at least one sensor;
determining whether the stop position is suitable for a user to board the vehicle based on a determination of an occurrence of a boarding event of the vehicle at the stop position, the determination of the occurrence of a boarding event being made based on at least one of the open/close state of the door and the detection result of whether the occupant has become seated;
storing the stop position as a suitable boarding position in a boarding position database when the stop position is determined to be suitable;
receiving a first vehicle dispatch request that was transmitted to a vehicle dispatch service from a terminal;
setting a boarding position in response to the first vehicle dispatch request, the boarding position being selected from among a plurality of suitable boarding positions that are stored in the boarding position database;
calculating a virtual stop line based on information about the stop position; and
using the virtual stop line to execute automated driving of the vehicle to the boarding position.

2. The boarding position setting method according to claim 1, wherein
the stop position stored as the suitable boarding position is a position where the vehicle stopped while the vehicle transported an occupant, delivered cargo or collected cargo.

3. The boarding position setting method according to claim 1, further comprising
acquiring a vehicle dispatch location included in a second vehicle dispatch request to the vehicle dispatch service, and
determining the vehicle dispatch location to be another suitable boarding position when an occupant has boarded the vehicle dispatched based on the second vehicle dispatch request at the vehicle dispatch location.

4. The boarding position setting method according to claim 1, further comprising
determining the stop position to be the suitable boarding position when a stop time of the vehicle at the stop position is equal to or greater than a predetermined time.

5. The boarding position setting method according to claim 4, wherein the predetermined time is a sum of a standby time of the vehicle until the occupant starts boarding and a time until the occupant completes boarding.

6. The boarding position setting method according to claim 1, wherein
the vehicle information includes the open/close state of the door of the vehicle, and
the stop position is determined to be the suitable boarding position when the door has opened or closed at the stop position in that the boarding event is deemed to have occurred.

7. The boarding position setting method according to claim 1, wherein
the vehicle information includes information regarding boarding by the occupant, and
the stop position is determined to be the suitable boarding position when a boarding of the occupant has been detected by a sensing unit of the vehicle in that the boarding event is deemed to have occurred.

8. The boarding position setting method according to claim 1, further comprising
determining a possibility of a stop at the stop position based on stop possibility information on a road map, wherein
the stop position is determined to be unsuitable for boarding when stopping at the stop position is not possible based on the stop possibility information on the road map.

9. The boarding position setting method according to claim 1, further comprising
calculating a representative position from a plurality of stop positions that are determined to be suitable boarding positions and that are clustered together, and
storing the representative position as the boarding position.

10. The boarding position setting method according to claim 1, further comprising
linking and storing a time band suitable for boarding to the boarding position.

11. The boarding position setting method according to claim 1, wherein
the boarding position is stored also as an alighting position.

12. The boarding position setting method according to claim 1, further comprising
acquiring surroundings information of the boarding position,
determining a state of the boarding position based on the surroundings information, and
linking and storing the state of the boarding position that was determined.

13. The boarding position setting method according to claim 12, wherein
the surroundings information is acquired by a measuring unit mounted in the vehicle.

14. The boarding position setting method according to claim 12, wherein
the surroundings information is acquired by a measuring unit installed in a road where the boarding position is located.

15. The boarding position setting method according to claim 12, wherein
the surroundings information is predicted based on a chronological change in the surroundings information, and
the state is predicted based on the surroundings information that was predicted.

16. The boarding position setting method according to claim 12, wherein
the state is predicted based on a chronological change in the state.

17. The boarding position setting method according to claim 12, further comprising
acquiring regional information of a region that includes the boarding position, wherein
the state of the boarding position is determined based on the regional information.

18. The boarding position setting method according to claim 1, wherein
the stop position is determined to be suitable when at least one of a following condition is satisfied: a stop time of the vehicle at the stop position is greater than or equal to a predetermined length of time, the open/close state of the door indicates that the door of the vehicle has opened or closed at the stop position, and the detection result indicates that the occupant has become seated.

19. A boarding position setting device comprising:
at least one sensor provided in a vehicle and configured to acquire vehicle information, the vehicle information including position information of the vehicle, a vehicle speed of the vehicle, and at least one of an open/close state of a door of the vehicle and a detection result of whether an occupant has become seated in the vehicle;
a controller arranged to receive the vehicle information transmitted from the at least one sensor; and
a communication unit,
the controller being configured to:
recognize a stop position of the vehicle based on the vehicle speed transmitted from the at least one sensor in the vehicle,
determine whether the stop position is a suitable for a user to board the vehicle based on a determination of an occurrence of a boarding event of the vehicle at the stop position, the determination of the occurrence of a boarding event being made based on at least one of the open/close state of the door and the detection result of whether the occupant has become seated, and
transmit information of the stop position, via the communication unit, to an external storage device that stores the stop position as a suitable boarding position in a boarding position database upon determining the stop position to be suitable,
receive a first vehicle dispatch request that was transmitted to a vehicle dispatch service from a terminal,
set a boarding position in response to the first vehicle dispatch request, the controller selecting boarding position from among a plurality of suitable boarding positions that are stored in the boarding position database of the external storage device the boarding position database of the external storage device,
calculate a virtual stop line based on information about the stop position; and
use the virtual stop line to execute automated driving of the vehicle to the boarding position.

20. The boarding position setting device according to claim 19, wherein
the controller is configured to determine that the stop position is suitable when at least one of a following condition is satisfied: the stop time of the vehicle at the stop position is greater than or equal to a predetermined length of time, the open/close state of the door indicates that the door of the vehicle has opened or closed at the stop position, and the detection result indicates that the occupant has become seated.

21. A boarding position setting system comprising:
at least one sensor provided in a vehicle configured to acquire vehicle information that includes position information of the vehicle, a vehicle speed of the vehicle, and at least one of an open/close state of a door of the vehicle and a detection result of whether an occupant has become seated in the vehicle; and
a processor arranged to receive the vehicle information from the at least one sensor, the processor being configured to:
recognize a stop position of the vehicle based on the vehicle speed transmitted from the at least one sensor;
determine whether the stop position is suitable for a user to board the vehicle based on a determination of an occurrence of a boarding event of the vehicle at the stop position, the determination of the occurrence of a boarding event being made based on at least one of the open/close state of the door and the detection result of whether the occupant has become seated;
store the stop position as a suitable boarding position in a boarding position database when the stop position has been determined to be suitable;
acquire a first vehicle dispatch request that was transmitted to a vehicle dispatch service from a terminal; and
set a boarding position in response to the first vehicle dispatch request, the processor selecting the boarding position from among a plurality of suitable boarding positions that are stored in the boarding position database;
calculate a virtual stop line based on information about the stop position; and
use the virtual stop line to execute automated driving of the vehicle to the boarding position.

22. The boarding position setting system according to claim 21, wherein
the processor is configured to determine that the stop position is suitable when at least one of a following condition is satisfied: the stop time of the vehicle at the stop position is greater than or equal to a predetermined length of time, the open/close state of the door indicates that the door of the vehicle has opened or closed at the stop position, and the detection result indicates that the occupant has become seated.

23. A boarding position setting device comprising a processor configured to:
acquire vehicle information transmitted from at least one sensor provided in a vehicle, the vehicle information including position information of the vehicle, a vehicle speed of the vehicle, and at least one of an open/close state of a door of the vehicle and a detection result of whether an occupant has become seated in the vehicle;
recognize a stop position of the vehicle based on the vehicle speed transmitted from the at least one sensor;
determine whether the stop position is suitable for a user to board the vehicle based on a determination of an occurrence of a boarding event of the vehicle at the stop position, the determination of the occurrence of a boarding event being made based on at least one of the open/close state of the door and the detection result of whether the occupant has become seated;
store the stop position as a suitable boarding position in a boarding position database when the stop position has been determined to be suitable;
acquire a first vehicle dispatch request to a vehicle dispatch service;
set a boarding position in response to the first vehicle dispatch request, the processor selecting boarding position from among a plurality of suitable boarding positions that are stored in the boarding position database;
calculate a virtual stop line based on information about the stop position; and
use the virtual stop line to execute automated driving of the vehicle to the boarding position.

24. The boarding position setting device according to claim 23, wherein
the processor is configured to determine that the stop position is suitable when at least one of a following condition is satisfied: the stop time of the vehicle at the stop position is greater than or equal to a predetermined length of time, the open/close state of the door indicates that the door of the vehicle has opened or closed at the stop position, and the detection result indicates that the occupant has become seated.

* * * * *